United States Patent
Gervais et al.

(10) Patent No.: US 10,117,376 B2
(45) Date of Patent: Nov. 6, 2018

(54) EQUALIZING AIR PRESSURE ON AIR SEEDERS

(71) Applicant: CNH Industrial Canada, Ltd., Saskatoon (CA)

(72) Inventors: Joel Gervais, Saskatoon (CA); Kenneth D. Paluck, Saskatoon (CA); Ka Po Catherine Hui, Saskatoon (CA); James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 4 days.

(21) Appl. No.: 15/253,273

(22) Filed: Aug. 31, 2016

(65) Prior Publication Data

US 2018/0054957 A1 Mar. 1, 2018

(51) Int. Cl.
*A01C 7/20* (2006.01)
*A01C 15/04* (2006.01)
*A01C 7/08* (2006.01)

(52) U.S. Cl.
CPC .............. *A01C 7/082* (2013.01); *A01C 15/04* (2013.01)

(58) Field of Classification Search
CPC ........... A01C 7/08; A01C 15/04; A01C 7/081; A01C 7/082; A01C 7/084; A01C 23/04
USPC .................................................. 111/174, 175
See application file for complete search history.

(56) References Cited

U.S. PATENT DOCUMENTS

| | | | |
|---|---|---|---|
| 1,850,937 A | * | 3/1932 | Messinger ............ B05B 7/1486 138/37 |
| 3,805,522 A | | 4/1974 | Sheppard |
| 3,883,324 A | | 5/1975 | Balla et al. |
| 4,191,500 A | | 3/1980 | Oberg et al. |
| 4,453,866 A | | 6/1984 | Ryan |
| 4,685,843 A | | 8/1987 | Kelm |
| 4,852,809 A | | 8/1989 | Davis et al. |
| 5,485,962 A | | 1/1996 | Moss |
| 5,775,585 A | * | 7/1998 | Duello ................... A01C 15/04 239/654 |

(Continued)

OTHER PUBLICATIONS

"Air Seeder Distribution Accuracy", D-Cup Diffuser Weblog, News & Insight from the Field of No-Till Seeding, Sep. 5, 2013 (3 pages).

(Continued)

*Primary Examiner* — John Weiss
(74) *Attorney, Agent, or Firm* — Rebecca L. Henkel; Richard K. DeMille (57) ABSTRACT

An agricultural air seeding system, comprising: an agricultural planting implement including at least one section at least one secondary header removably attached to the at least one section, at least one attachment bar attached to the at least one section, and a plurality of application tools removably attached to the at least one attachment bar and fluidly coupled to the at least one secondary header; an agricultural air cart coupled to the agricultural planting implement; and a pneumatic distribution system fluidly coupled to the agricultural planting implement and the agricultural air cart, the pneumatic distribution system including a plurality of conduits capable of transporting agricultural product, at least one of the plurality of conduits including at least one flow obstruction such that a substantially equal air pressure is delivered to the plurality of application tools.

13 Claims, 7 Drawing Sheets

(56) References Cited

U.S. PATENT DOCUMENTS

| | | | |
|---|---|---|---|
| 6,273,648 B1 | 8/2001 | Poncelet et al. | |
| 6,290,433 B2 * | 9/2001 | Poncelet | A01C 7/082 |
| | | | 406/181 |
| 6,443,671 B1 | 9/2002 | Weiste | |
| 7,162,962 B2 * | 1/2007 | Fuessel | A01C 7/081 |
| | | | 111/176 |
| 7,213,525 B2 * | 5/2007 | Meyer | A01C 7/081 |
| | | | 111/174 |
| 7,669,538 B2 * | 3/2010 | Memory | A01C 7/082 |
| | | | 111/174 |
| 8,234,987 B2 * | 8/2012 | Georgison | A01C 7/081 |
| | | | 111/176 |
| 8,336,471 B2 | 12/2012 | Gilstring | |
| 8,469,636 B2 | 6/2013 | Jost et al. | |
| 9,072,216 B2 * | 7/2015 | Johnson | A01C 7/081 |
| 2012/0227647 A1 | 9/2012 | Gelinske et al. | |

OTHER PUBLICATIONS

"An Investigation of Air Seeder Component Characteristics", Agricultrue and Rural Development, Feb. 4, 2004 (16 pages.).

* cited by examiner

EQUALIZING AIR PRESSURE ON AIR SEEDERS

BACKGROUND OF THE INVENTION

1. Field of the Invention

The present invention relates to agricultural particulate-conveying equipment, and, more particularly, to pneumatic distribution systems used with such agricultural particulate-conveying equipment.

2. Description of the Related Art

Air seeders are one type of particulate-conveying equipment that are commonly used in agricultural applications. They are towed behind agricultural vehicles such as tractors, for example, to apply agricultural products such as seed, fertilizer, and/or herbicide to a field. Air seeders include two primary components: an air cart and an agricultural seeding/fertilizing implement.

Air carts are often towed behind the agricultural seeding/fertilizing implement, which in turn is towed behind the agricultural vehicle. Alternatively, air carts can be towed directly by an agricultural vehicle, the air cart then tows an agricultural seeding/fertilizing implement behind it. Air carts generally include a metering system for dispensing material from one or more tanks and a pneumatic distribution system for delivering the material from the tank or tanks to the soil prepared by the seeding/fertilizing implement. In the case of multiple tanks, the tanks can be separate tanks, or a single tank with internal compartments. A centrifugal fan provides at least one airstream which flows through the pneumatic distribution system. Material is first introduced to the air stream by the metering system at a primary distribution manifold located either below or above the metering system. Material is carried by the air stream through distribution lines to a series of secondary distribution manifolds, which in turn distribute the material through distribution lines to ground openers on the seeding/fertilizing implement so that the product may be evenly delivered to the soil.

For initial hookup of the air seeder, the agricultural vehicle is typically backed up to and coupled with the seeding/fertilizing implement, which in turn is backed up to and coupled with the air cart (e.g., by using respective hitch pins or the like, and assuming that the air cart is behind rather than in front of the seeding/fertilizing implement). All necessary fluid lines and electrical harnesses are then connected between the agricultural vehicle, seeding/fertilizing implement and air cart. For example, it may be necessary to connect hydraulic lines, air lines, electrical power lines and/or electronic harnesses between the pieces of equipment.

With seeding/fertilizing implements associated with air seeders becoming ever larger, the number and various lengths of air lines between the seeding/fertilizing implement and the air cart increase, thereby resulting in variations in pressure drop at different sections of the pneumatic distribution system. For example, shorter air lines are required between the air cart and the middle sections of the seeding/fertilizing implement, while longer air lines are required between the air cart and the outer wing sections of the seeding/fertilizing implement. The pressure drop at the longer air line areas (wing sections) is greater than the pressure drop at the shorter air line areas (middle sections), which can result in an uneven agricultural product delivery and distribution, which in turn may adversely affect seed germination or fertilizer application rate.

What is needed in the art is an air seeder with a pneumatic distribution system capable of evenly distributing material in very large tillage implements.

SUMMARY OF THE INVENTION

The present invention provides an improved pneumatic distribution system for agricultural particulate-conveying equipment which includes conduit for transporting agricultural material, the conduit having flow obstructions to equalize the air pressures delivered to secondary headers.

The present invention also provides a way of equalizing the air pressure in air/product delivery lines of agricultural implements by varying the lengthwise bend radius prior to being fluidly connected to secondary headers.

The present invention in one form is directed to an agricultural air seeding system, comprising an agricultural planting implement including at least one section, at least one secondary header removably attached to the at least one section, at least one attachment bar attached to the at least one section, and a plurality of application tools removably attached to the at least one attachment bar and fluidly coupled to the at least one secondary header; an agricultural air cart coupled to the agricultural planting implement; and a pneumatic distribution system fluidly coupled to the agricultural planting implement and the agricultural air cart, the pneumatic distribution system including a plurality of conduits capable of transporting agricultural product, at least one of the plurality of conduits including at least one flow obstruction such that a substantially equal air pressure is delivered to the plurality of application tools.

The present invention in another form is directed to a pneumatic distribution system fluidly coupled to an agricultural planting implement with a plurality of application tools and an agricultural air cart, the pneumatic distribution system including a plurality of conduits capable of transporting agricultural product, at least one of the plurality of conduits including at least one flow obstruction such that a substantially equal air pressure is delivered to the plurality of application tools.

The present invention in another form is directed to a method of equalizing air/product flow in agricultural air seeding systems, comprising: providing an agricultural planting implement including at least one section, at least one secondary header removably attached to the at least one section, at least one attachment bar attached to the at least one section, and a plurality of application tools removably attached to the at least one attachment bar and fluidly coupled to the at least one secondary header; providing an agricultural air cart coupled to the agricultural planting implement; providing a pneumatic distribution system fluidly coupled to the agricultural planting implement and the agricultural air cart, the pneumatic distribution system including a plurality of conduits capable of transporting agricultural product, at least one of the plurality of conduits including at least one flow obstruction; and arranging the plurality of conduits such that a substantially equal air pressure is delivered to the plurality of application tools.

An advantage of the present invention is that it is both simple to install and maintain.

Another advantage of the present invention is it helps eliminate excess hose currently used on air seeders, which improves maneuverability of the equipment while reducing cost and potential hose wear.

Another advantage of the present invention is that seeds are more evenly seeded into the soil independent of the location of air lines in the implement.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
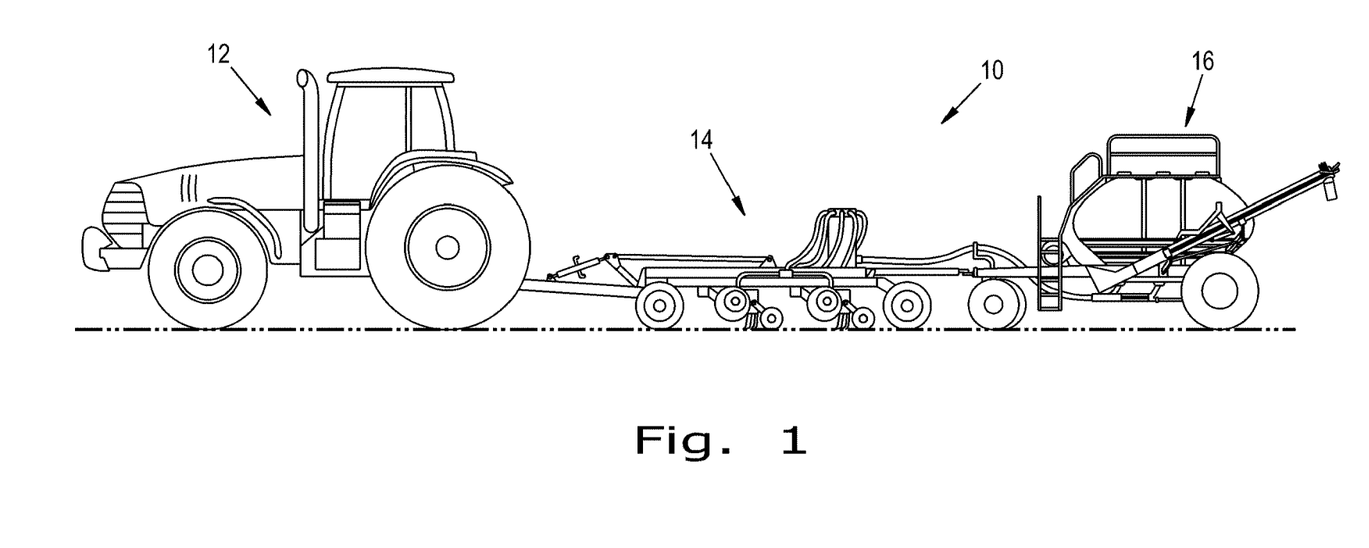
FIG. 1 is a perspective view of an exemplary agricultural air seeding system of the present invention.

Referring now to FIG. 1, there is shown an illustration of an exemplary agricultural seeding system 10 according to the present invention. Agricultural seeding system 10 generally includes an agricultural conveyance vehicle 12, agricultural planting implement 14, and agricultural air cart 16. Agricultural air cart 16 may also be configured to be towed in front of, rather than behind, agricultural planting implement 14.

Agricultural conveyance vehicle 12 can be any vehicle designed for agricultural use to carry, push, or tow one or more implements. The most common example of agricultural conveyance vehicle 12 is a tractor.

Agricultural planting implement 14 can be any implement designed for agricultural use to prepare soil, and plant seeds or distribute fertilizers. They are commonly known as "planters", "air drills", "floaters", "fertilizer applicators", or "fertilizer application equipment". Agricultural planting implement 14 is described in detail further in this specification.

Figure 2:
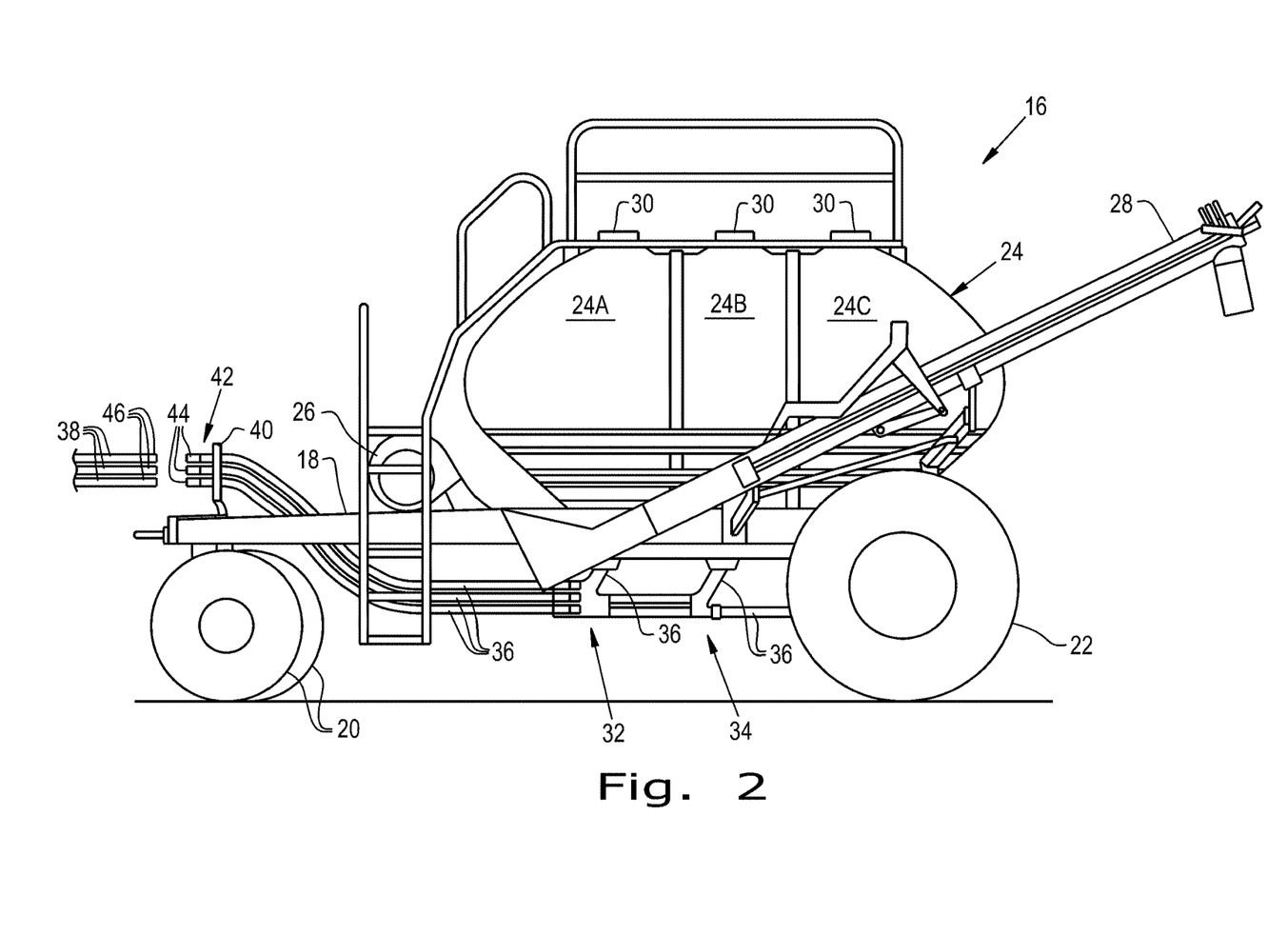
FIG. 2 is a side view of an exemplary agricultural air cart of the present invention

Now referring to FIG. 2, agricultural air cart 16 is illustrated. Agricultural air cart 16 generally includes a frame 18 which carries steerable front wheels 20, rear wheels 22, tank 24, blower fan 26, and auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein. In other embodiments not shown, air cart 16 may include multiple tanks 24.

Agricultural air cart 16 further includes pneumatic distribution system 32 for delivering the agricultural material to the trenches in the soil formed by agricultural planting implement 14. Pneumatic distribution system 32 includes a metering system 34 (not specifically shown), blower fan 26, and a plurality of air line conduits 36. In the illustrated embodiment, three primary air line conduits 36 are shown, one from each tank compartment 24A, 24B and 24C. However, the number of air lines conduits 36 can vary, depending upon the application.

Air line conduits 36 extend to and terminate at a convenient location for coupling with air lines conduits 38 associated with agricultural planting implement 14. In the embodiment shown, air line conduits 36 are supported at the forward end of agricultural air cart 16 with a support 40. Each air line conduit 36 terminates at a respective fluid (air) line connection 42. In the embodiment shown, each fluid line connection 42 includes a female connector 44 associated with each air line conduit 36 and a male connector 46 associated with an end of each air line conduit 38. However, the orientation of each fluid line connection 42 may be reversed such that each female connector 44 is associated with a corresponding air line conduit 38 of agricultural planting implement 14. Each male connector 46 is received within and fluidly seals with a respective female connector 44.

During use, agricultural conveyance vehicle 12 is backed up to agricultural planting implement 14 and mechanically hitched together; the two then back up to agricultural air cart 16, and are mechanically hitched together. Fluid line connections 42 between mating air line conduits 36, 38 are made by inserting male connectors 46 into respective female connectors 44. Each fluid line connection 42 is then latched together using a suitable latch. Other appropriate connections are also made between agricultural planting implement 14 and agricultural air cart 16, such as hydraulic, electronic and/or electrical connections (not shown). Agricultural seeding system 10 may then be used to deposit material into the trenches formed by agricultural planting implement 14.

Figure 3:
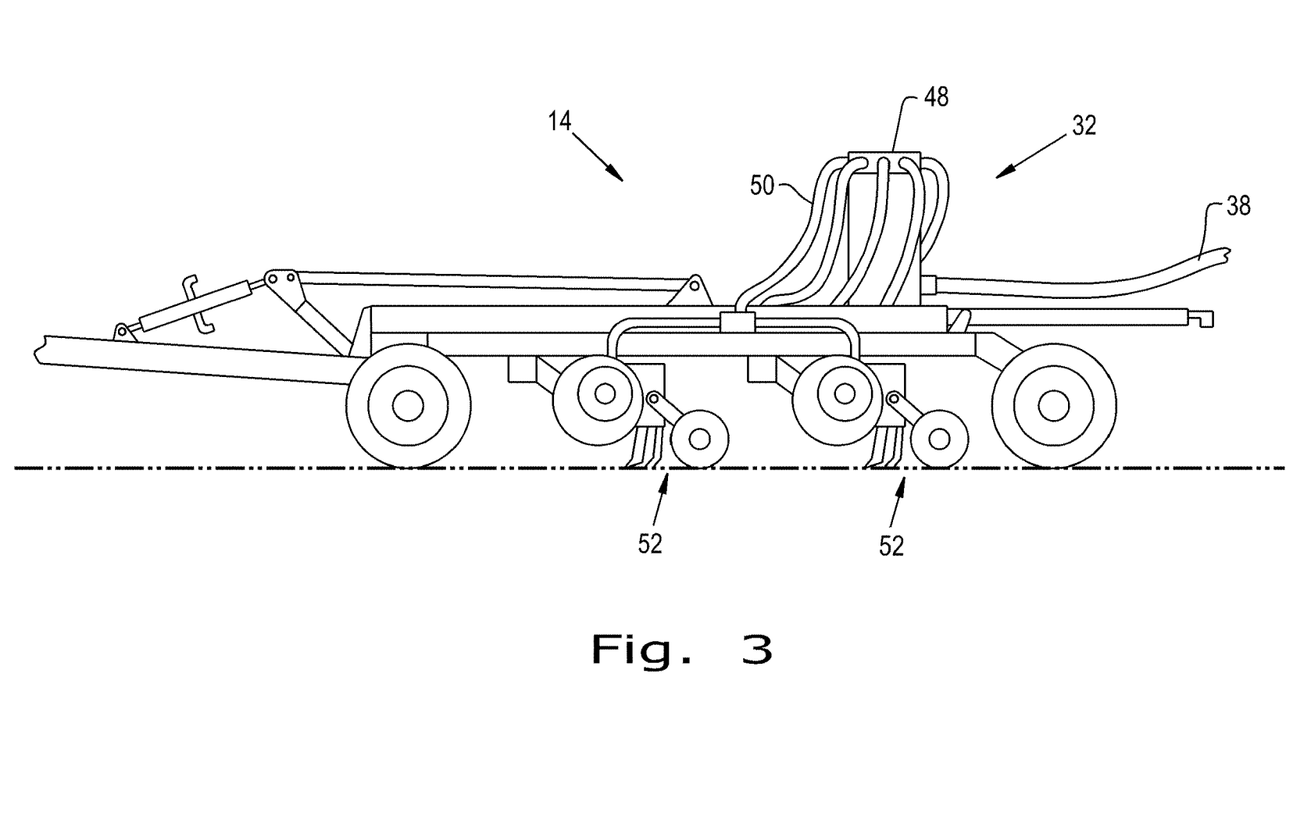
FIG. 3 is a side view of an exemplary agricultural planting implement of the present invention.
Figure 4:
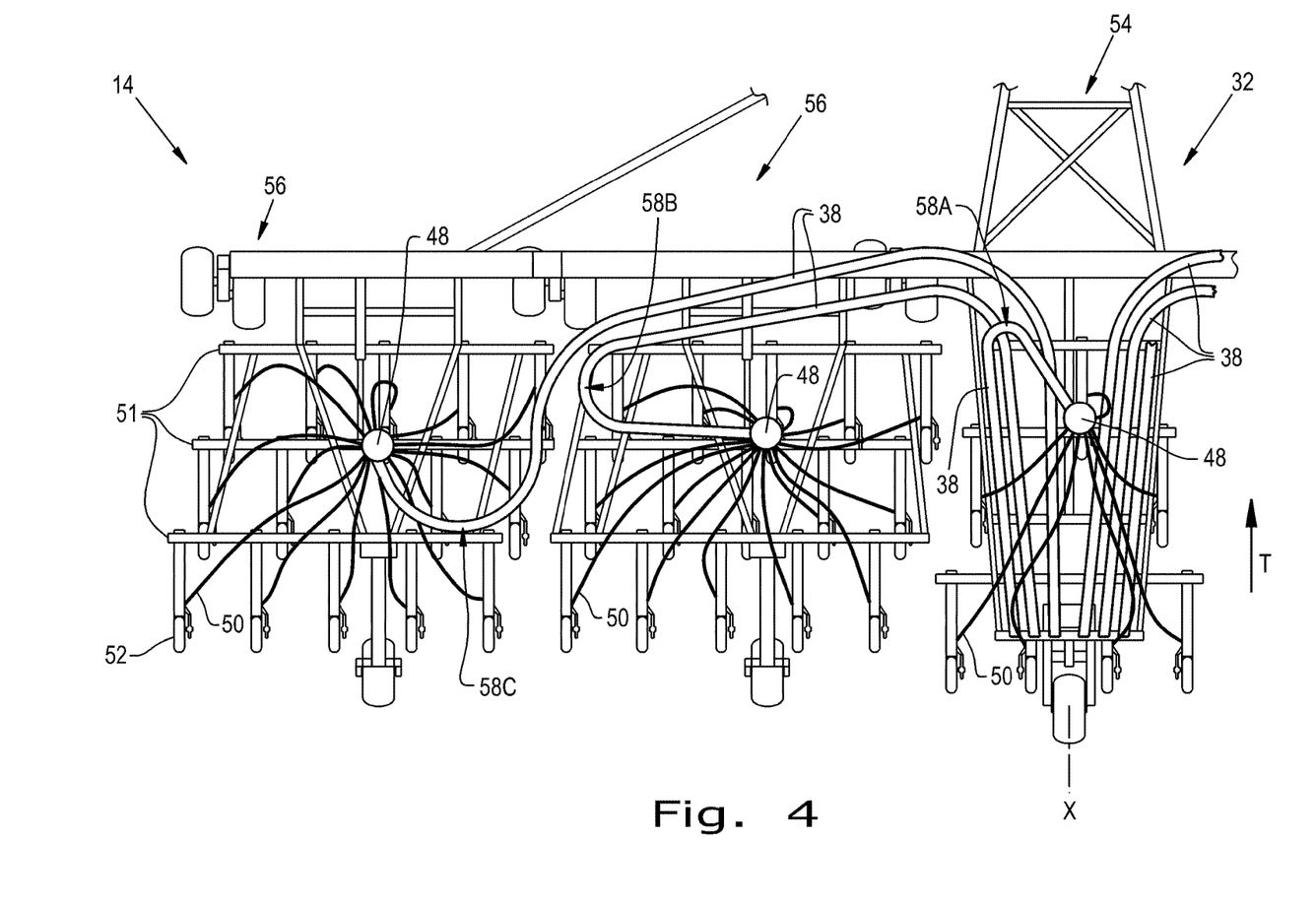
FIG. 4 is an overhead view of a pneumatic distribution system of the present invention.

Now referring to FIGS. 3 and 4, with continued reference to FIG. 2, agricultural planting implement 14 is described. Agricultural planting implement 14 includes pneumatic distribution system 32, air line conduits 38, secondary header 48, secondary conduits 50, attachment bars 51, and row units 52 (also known as application tools). In operation, a mixture of agricultural product such as seeds is mixed with air and conveyed through air line conduits 38 and into secondary header 48. The air/product mixture is then distributed evenly through secondary conduits 50 to the row units 52. Row units 52 then deposit the agricultural product into the soil. Agricultural planting implement 14 includes at least one section; typically, it may include a center section 54 and at least one wing section 56 on each side of the center section. Each of the sections includes at least one secondary header 48. In the example shown, agricultural planting element 14 has one center section 54 and two wing sections 56. Not shown on the other side of center section 54 are two additional wing sections 56. Pneumatic distribution system 32, in addition to components found on agricultural air cart 16, further includes air line conduits 38, secondary header 48, and secondary conduits 50 on agricultural planting implement 14. As air line conduits 38 of agricultural planting element 14 travel to their fluid connections to the secondary headers 48, different lengthwise radii of curvature may be used in order to provide differing flow obstructions to equalize the air pressures delivered to the secondary headers 48.

The radius of the curved air line conduits 38 increase in dimension in proportion to the distance of their respective secondary header 48 from the midline axis X-X, which is parallel to the travel direction T. Specifically, the greater the perpendicular distance, the greater the radius. As illustrated for the three sections shown, each with their own secondary header 48, radius 58C is greater than radius 58B, which in turn is greater than radius 58A. As an example, the lengthwise radii of curvature shown in FIG. 4 may be as follows: radius 58A=2.5 inches, radius 58B=7.5 inches, and radius 58C=15 inches. It is to be understood that other radial dimensions that increase from the midline axis X-X to the outside of the implement may be used while remaining within the spirit and scope of the present invention.

It is to be understood that curved air line conduits 36 on agricultural air cart 16 may also include differing lengthwise radii of curvature as described above in order to provide flow obstructions to air line conduits 38 of agricultural planting implement 14, thereby equalizing air pressures delivered to the secondary headers 48.

Air line conduits 36 and 38 may be comprised of flexible materials and/or steel (or other non-flexible material). It may be preferential to have the curved sections comprised of steel or other non-flexible material so that wear is reduced and to facilitate fabrication, installation, and maintenance.

Now referring to FIGS. 5-9, alternate embodiments of pneumatic distribution system 32 are shown, each used to equalize air pressure among secondary headers or other distribution equipment. Each of the alternate embodiments can be used in replacement of or in addition to the varying lengthwise radii of curvature described above, alone or in any combination.

Figure 5A:
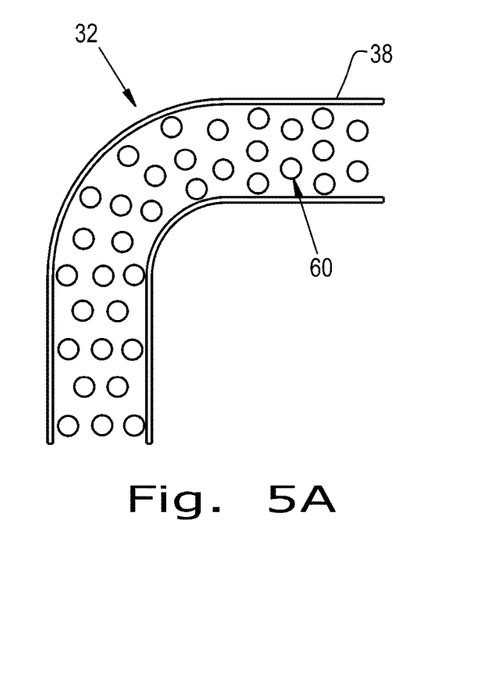
FIG. 5A is an alternate embodiment of the present invention.

FIG. 5A illustrates the air line conduit 38 of pneumatic distribution system 32 including internal dimples 60, which increase the roughness and affect the airflow of the air/product mixture.

Figure 5B:
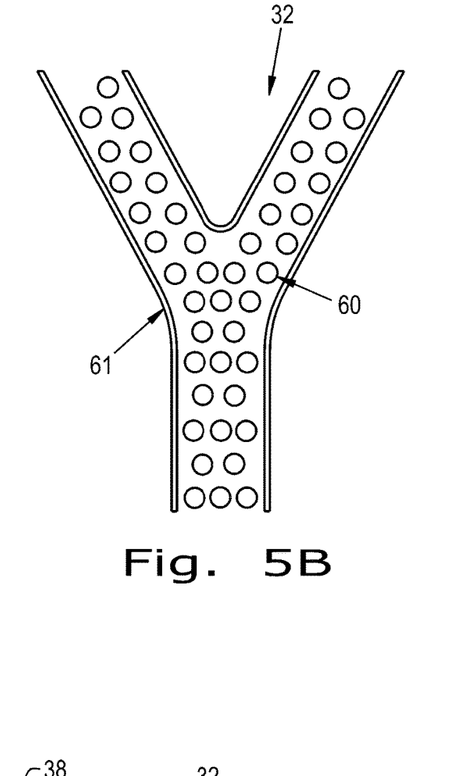
FIG. 5B is an alternate embodiment of the present invention.
Figure 6:
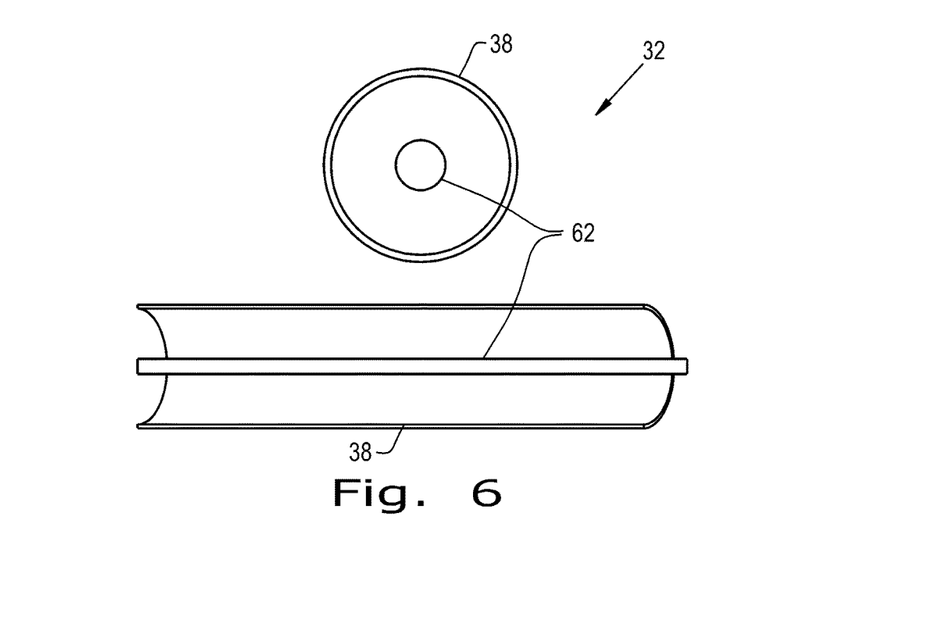
FIG. 6 is an alternate embodiment of the present invention.
Figure 7:
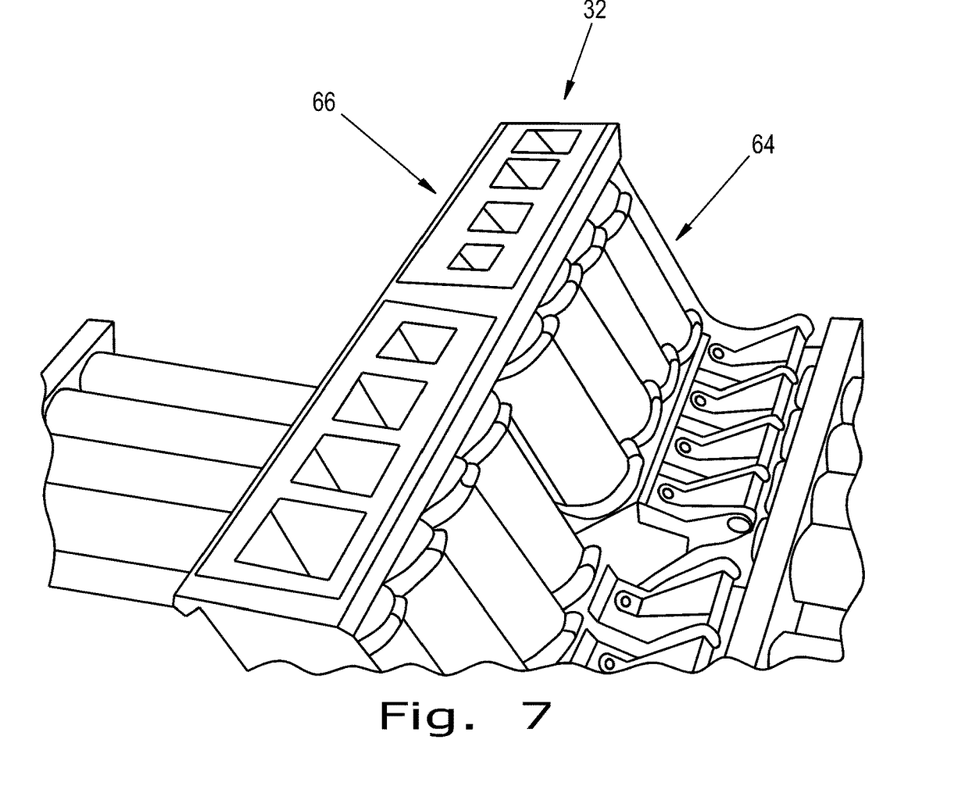
FIG. 7 is an alternate embodiment of the present invention.
Figure 8:
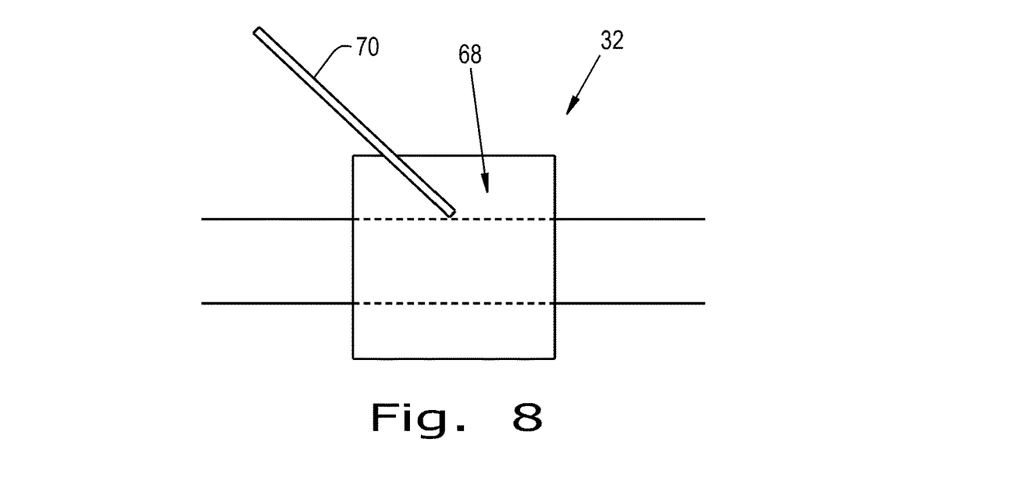
FIG. 8 is an alternate embodiment of the present invention.
Figure 9:
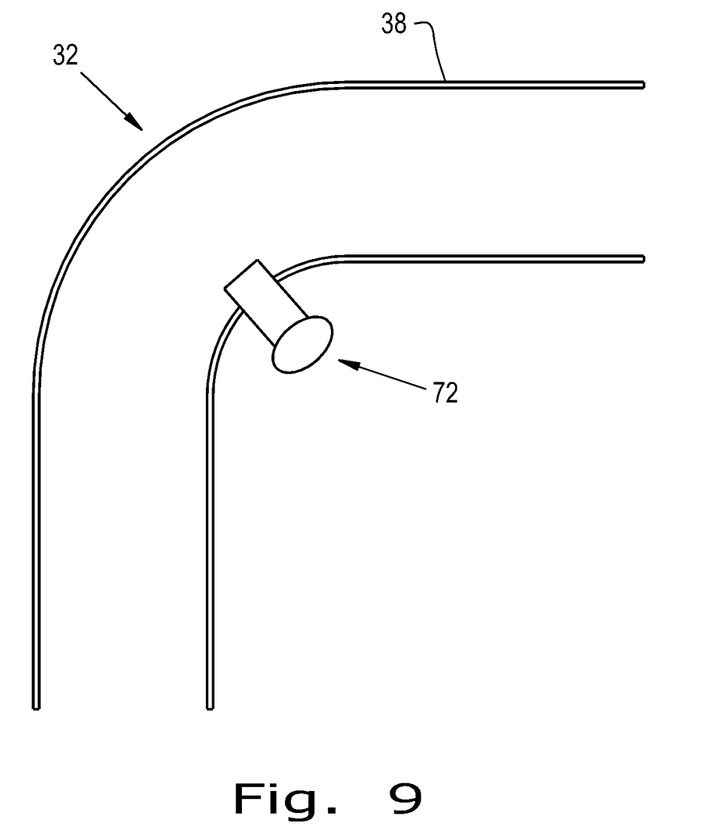
FIG. 9 is an alternate embodiment of the present invention.

FIG. 5B illustrates the air line conduit 38 of pneumatic distribution system 32 including internal dimples 60, which increase the roughness and affect the airflow of the air/product mixture; and bifurcation 61, which affects the airflow of the air/product mixture.

FIG. 6 shows air line conduit 38 in pneumatic distribution system 32 with an internal component 62 inserted, which can affect the airflow of the air/product mixture.

FIG. 7 shows a metering manifold 64 in pneumatic distribution system 32, including a restriction plate 66 which can affect the airflow of the air/product mixture.

FIG. 8 illustrates a housing 68 in pneumatic distribution system 32, including an air flap 70 which can affect the airflow of the air/product mixture.

FIG. 9 illustrates an air bleeder 72 in an air line conduit 38 of pneumatic distribution system 32, which can affect the airflow of the air/product mixture.

It should be understood that while inventive agricultural seeding apparatuses have been described, the invention can be applied to similar agricultural particulate-conveying equipment such as “planters”, “floaters”, “fertilizer applicators”, or “fertilizer application equipment”.

While an improved pneumatic distribution system has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural air seeding system, comprising:
- an agricultural planting implement, including:
  - at least one section;
  - at least one secondary header removably attached to the at least one section;
  - at least one attachment bar attached to the at least one section; and
  - a plurality of application tools removably attached to the at least one attachment bar and fluidly coupled to the at least one secondary header;
- an agricultural air cart coupled to the agricultural planting implement; and
- a pneumatic distribution system fluidly coupled to the agricultural planting implement and the agricultural air cart, the pneumatic distribution system including a plurality of conduits capable of transporting agricultural product, at least two of the plurality of conduits each having a differing respective length and including at least one flow obstruction, the at least one flow obstruction of said at least two conduits of the plurality of conduits including a curved section with a respective lengthwise radius of curvature that corresponds to the respective length of said at least two conduits such that a substantially equal air pressure is delivered to the plurality of application tools.

2. The agricultural air seeding system of claim 1, wherein each said curved section being located on at least one of the agricultural planting implement and the agricultural air cart.

3. The agricultural air seeding system of claim 1, wherein the agricultural planting implement further includes a midpoint axis parallel to a direction of travel, wherein each said lengthwise radius of curvature is proportional to a proximity to the midpoint axis.

4. The agricultural air seeding system of claim 3, wherein the lengthwise radius of curvature of each curved section is larger than the lengthwise radius of curvature of an adjacent curved section which is closer to the midpoint axis.

5. The agricultural air seeding system of claim 2, wherein the curved sections are comprised of steel or other non-flexible material.

6. The agricultural air seeding system of claim 1, wherein each of the at least one flow obstructions further includes at least one of:
- b) internal dimples;
- c) internal dimples and a bifurcation;
- d) an internal component;
- e) a restriction on a metering manifold of the pneumatic distribution system;
- f) an air flap with rectangular cross-section in the pneumatic distribution system; and
- g) an air bleeder on an inside of a bend of at least one of the plurality of conduits.

7. A pneumatic distribution system fluidly coupled to an agricultural planting implement including a plurality of application tools and an agricultural air cart, the pneumatic distribution system, comprising:
- a plurality of conduits capable of transporting agricultural product, at least two of the plurality of conduits each having a differing respective length and including at least one flow obstruction, the at least one flow obstruction of said at least two conduits of the plurality of conduits including a curved section with a respective lengthwise radius of curvature that corresponds to the respective length of said at least two conduits such that said plurality of conduits is configured for delivering a substantially equal air pressure to the plurality of application tools.

8. The pneumatic distribution system of claim 7, wherein each said curved section being located on at least one of the agricultural planting implement and the agricultural air cart.

9. The pneumatic distribution system of claim 7, wherein the agricultural planting implement further includes a midpoint axis parallel to a direction of travel, wherein each said lengthwise radius of curvature is configured for being proportional to a proximity to the midpoint axis.

10. The pneumatic distribution system of claim 9, wherein the lengthwise radius of curvature of each curved section is larger than the lengthwise radius of curvature of an adjacent curved section which is closer to the midpoint axis.

11. The pneumatic distribution system of claim 8, wherein the curved sections are comprised of steel or other non-flexible material.

12. The pneumatic distribution system of claim 7, wherein each of the at least one flow obstructions further includes at least one of:
  b) internal dimples;
  c) internal dimples and a bifurcation;
  d) an internal component;
  e) a restriction on a metering manifold of the pneumatic distribution system;
  f) an air flap with rectangular cross-section in the pneumatic distribution system; and
  g) an air bleeder on an inside of a bend of at least one of the plurality of conduits.

13. An agricultural air seeding system, comprising:
an agricultural planting implement, including:
  at least one section;
  at least one secondary header removably attached to the at least one section;
  at least one attachment bar attached to the at least one section; and
  a plurality of application tools removably attached to the at least one attachment bar and fluidly coupled to the at least one secondary header;
an agricultural air cart coupled to the agricultural planting implement; and
a pneumatic distribution system fluidly coupled to the agricultural planting implement and the agricultural air cart, the pneumatic distribution system including a plurality of conduits capable of transporting agricultural product, and at least two of the plurality of conduits each have a differing respective length and include at least one flow obstruction such that the plurality of conduits delivers substantially equal air pressure to the plurality of application tools, wherein said at least one flow obstruction of each of said at least two conduits of said plurality of conduits includes at least one of:
  a) a curved section;
  b) internal dimples;
  c) internal dimples and a bifurcation;
  d) an internal component in at least one of the plurality of conduits;
  e) a restriction on a metering manifold of the pneumatic distribution system;
  f) an air flap with rectangular cross-section in the pneumatic distribution system; and
  g) an air bleeder on an inside of a bend of at least one of the plurality of conduits.

* * * * *